(12) United States Patent
Coates, III et al.

(10) Patent No.: US 6,182,695 B1
(45) Date of Patent: Feb. 6, 2001

(54) BREAKAWAY COUPLING AND COUPLER THEREFOR

(75) Inventors: Gordon R. Coates, III, County of St. Charles; Frank R. Suher, County of St. Louis, both of MO (US)

(73) Assignee: Husky Corporation, Pacific, MO (US)

( * ) Notice: Under 35 U.S.C. 154(b), the term of this patent shall be extended for 0 days.

(21) Appl. No.: 09/560,002

(22) Filed: Apr. 28, 2000

(51) Int. Cl.[7] ...................................................... F16L 37/28

(52) U.S. Cl. ............... 137/614; 137/614.04; 137/315.01; 137/315.27; 285/311

(58) Field of Search ................................ 137/614, 614.04, 137/614.05, 614.03, 68.14, 315.01, 315.27; 285/311, 346

(56) References Cited

U.S. PATENT DOCUMENTS

| | | | |
|---|---|---|---|
| 3,664,375 | * 5/1972 | Marette | 137/614.04 |
| 3,881,514 | * 5/1975 | Berg | 137/614.04 |
| 4,827,977 | 5/1989 | Fink, Jr. . | |
| 5,365,973 | 11/1994 | Fink, Jr. et al. . | |
| 5,507,530 | * 4/1996 | Mahaney | 285/26 |
| 5,896,889 | * 4/1999 | Menard | 137/614.04 |
| 5,988,697 | * 11/1999 | Arosio | 285/124.1 |
| 6,102,062 | * 8/2000 | Pearl, II et al. | 137/614.03 X |

* cited by examiner

*Primary Examiner*—Kevin Lee
(74) *Attorney, Agent, or Firm*—Paul M Denk (57) ABSTRACT

A coupler is provided which is mountable to a fitting of a breakaway coupling to facilitate assembly and disassembly of the coupling. The coupling has a first fitting and a second fitting which are held together by a ball in the first fitting which is received in a detent in the second fitting. The second fitting has an outer sleeve on which the detent is formed, and an inner sleeve slideable in the outer sleeve. A latch ring on the inner sleeve is alignable with the groove. A spring biases the inner sleeve and latch ring into a locking position in which the detent balls are urged into engagement with the detent to hold the two fittings together. The coupler includes an open ended housing having a side wall and an end wall. A plate, securable to the second fitting inner sleeve, is received in the coupler housing for axial movement. A cam on an outer surface of the housing end wall is connected to the plate by a rod. The cam is pivotable between a first position in which its camming surface is out of engagement with the housing end wall and a second position in which its camming surface engages the housing end wall. As the cam is moved to the second position, the plate is pulled toward the housing end wall, thereby pulling the second fitting inner sleeve axially in the outer sleeve against the force of the spring to move the latch ring out of alignment with the groove sufficiently to enable the detent ball to move radially in its associated opening and to disengage the groove.

10 Claims, 5 Drawing Sheets

BREAKAWAY COUPLING AND COUPLER THEREFOR

STATEMENT REGARDING FEDERALLY SPONSORED RESEARCH OR DEVELOPMENT

Not Applicable.

CROSS-REFERENCE TO RELATED APPLICATIONS

Not applicable.

BACKGROUND OF THE INVENTION

This invention relates to breakaway couplings, and in particular, a breakaway coupling which requires a considerable amount of force (i.e. 200 lbs.) to couple and uncouple.

Breakaway couplings are commonly placed in gas delivery hoses at gas stations. Examples of such couplings are shown in U.S. Pat. Nos. 5,365,973 and 4,827,977, which are owned by the same assignee as the instant invention, and which are incorporated herein by reference. As is known, such couplings are provided to stop the flow of gasoline through the hose should a customer inadvertently forget to remove the fuel delivery nozzle from his car before leaving a gas station. When breakaway couplings are used, should a customer forget to remove the nozzle, the coupling will separate, and the valves therein will close to prevent a gasoline spill. However, depending upon the force of the separation, the fuel dispensing equipment can be damaged. It is thus important that the fuel dispenser and its associated components be inspected by trained personnel prior to putting the pump back into service.

Current breakaway couplings, however, require very little force to put the coupling back together. For example, in the coupling of the above noted patents, the coupling can be connected with as little as 10 lbs. of force. When the breakaway coupling is disconnected, the customer may attempt to reconnect the coupling. To prevent a customer from reassembling breakaway couplings, shear pin safety breakaway couplings have been developed. However, typical shear pin safety breakaways have a higher separation force than a reconnectable safety breakaway. Thus, dispensing equipment is subjected to undue forces during a driveaway. Shear pin safety breaks are also susceptible to pin degradation. Such degradation is due to nozzle imparted line shock, and can result in nuisance separation.

BRIEF SUMMARY OF THE INVENTION

A coupler is provided for a breakaway coupling for a fuel line, such as in a gas station fuel line. The breakaway coupling requires in excess of 150 lbs. of force to assemble and disassemble its two fittings, and the coupler is provided to enable someone to assemble (or disassemble) the coupling without the need to exert so much force.

The breakaway coupling includes a first fitting which is received in a second fitting. The first fitting includes a hollow sleeve defining a fuel flow path, a check valve movable in the sleeve between a closed position and an opened position to close and open the fuel flow path, openings around a distal end of the first fitting sleeve, and detent balls received in the openings and movable radially in the openings.

The second fitting includes an outer hollow sleeve sized to receive the first fitting sleeve and an inner hollow sleeve which is slidably received in the outer sleeve. The outer sleeve has a groove or a series of detents on an inner surface positioned to receive the detent balls when the first and second fittings are assembled together. The inner sleeve defines a fuel flow path through the second fitting and includes a check valve movable in the sleeve between a closed position and an opened position to close and open the fuel flow path. The inner sleeve has a reduced diameter section defining an annular space between the inner and outer sleeves. A latch ring is positionally fixed to the reduced diameter section outer surface. A stop on an inner surface of the outer sleeve limits axial movement of the inner sleeve relative to the outer sleeve.

A spring (made from a plurality of spring washers) is positioned between the outer sleeve stop and the latch ring and biases the inner sleeve to normally bear against the outer sleeve stop. The latch ring being positioned to be substantially aligned with the groove when the inner sleeve is in its normal position. Hence, the latch ring will urge the detent balls radially outwardly to engage the groove or detents to hold the two fittings together. To assemble or disassemble the coupling, the force of the spring member must be overcome. The spring member has a spring force greater than the force which can be easily generated by an average person. For example, the spring force is at least 150 lbs.

The coupler includes an open ended housing having a side wall and an end wall. A plate is received in the housing and is axial movable in the housing. A cam on an outer surface of the housing end wall is operatively connected to the plate by a rod extending through the housing end wall. The cam has a camming surface and is pivotable between a first position in which the camming surface is out of engagement with the housing end wall and a second position in which it engages the housing end wall. The coupler plate is securable to the second fitting inner sleeve. Preferably, the peripheral surface of the plate is threaded, and the inner surface of the second fitting inner sleeve is threaded, so that the plate can be threadably attached to the inner sleeve.

The coupler housing end wall is sized to abut an end surface of the second fitting outer sleeve when the plate is mounted to the second fitting inner sleeve and when the cam is in the first position. As the cam is moved from its first position to its second position, the coupler plate is pulled toward the housing end wall, thereby pulling the second fitting inner sleeve axially in the outer sleeve against the force of the spring to move the latch ring out of alignment with the groove sufficiently to enable the detent ball to move radially in its associated opening and to disengage the groove (or to insert the first fitting into the housing to a position where the detent balls are aligned with the groove with minimal force on behalf of the assembler). The coupler includes a lever handle which is used to move the coupler cam between its first and second positions. Thus, the coupler relies on the leverage of the handle to overcome the spring force. Thus, even though the spring force is much greater than can easily be generated by an average person, by relying on the leverage of the handle, the spring force can be easily overcome and the latch ring can be moved out of alignment with the detents or detent groove to permit assembly or disassembly of the coupling.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
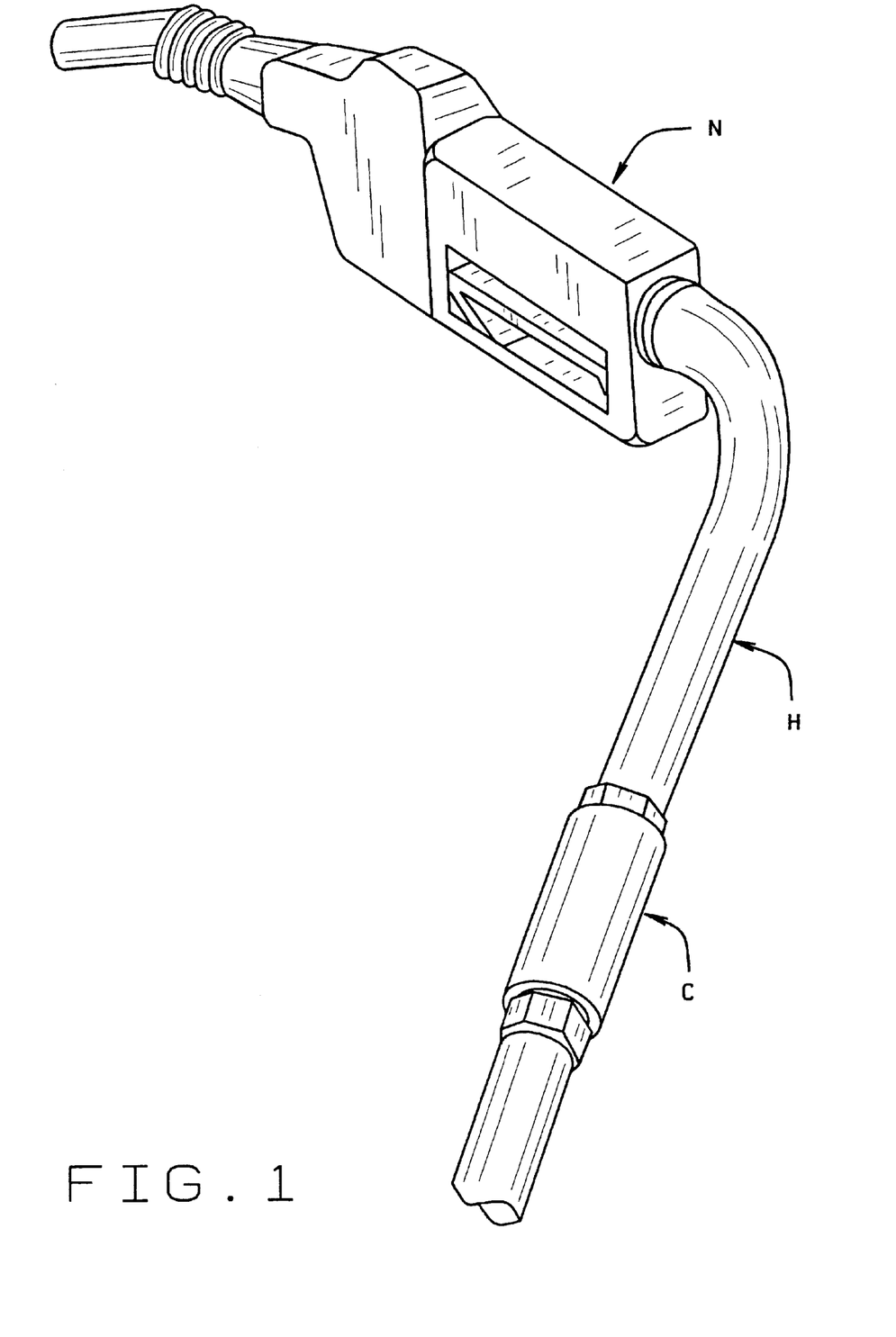
FIG. 1 is a perspective view of a fuel delivery nozzle and associated hose with a breakaway coupling in the hose.

Referring initially to FIG. 1, a flexible fuel dispensing hose H has a dispensing nozzle N at its end. The opposite end of the hose H is connected, as is known, to a fuel source such as a tank or a conventional gasoline pump (not shown). A breakaway coupling C is inserted in the hose H, and, as is known, operates to cut off the flow of fuel and vapors through the hose should the coupling be uncoupled, such as by someone driving away from the gas station prior to the nozzle being removed from his car.

Nozzle N is of a standard type known in the industry incorporating stage II vapor recovery features, and is designed to dispense fuel such as gasoline into a container such as the gasoline tank of an automobile or into a gasoline can, etc. In this particular embodiment, the nozzle is of the type that has an internal vapor recovery mechanism and is designed to be used with a flexible concentric fuel hose which has the vapor recovery portion of the fuel hose concentric to the fuel flow portion of the fuel hose.

Figure 2:
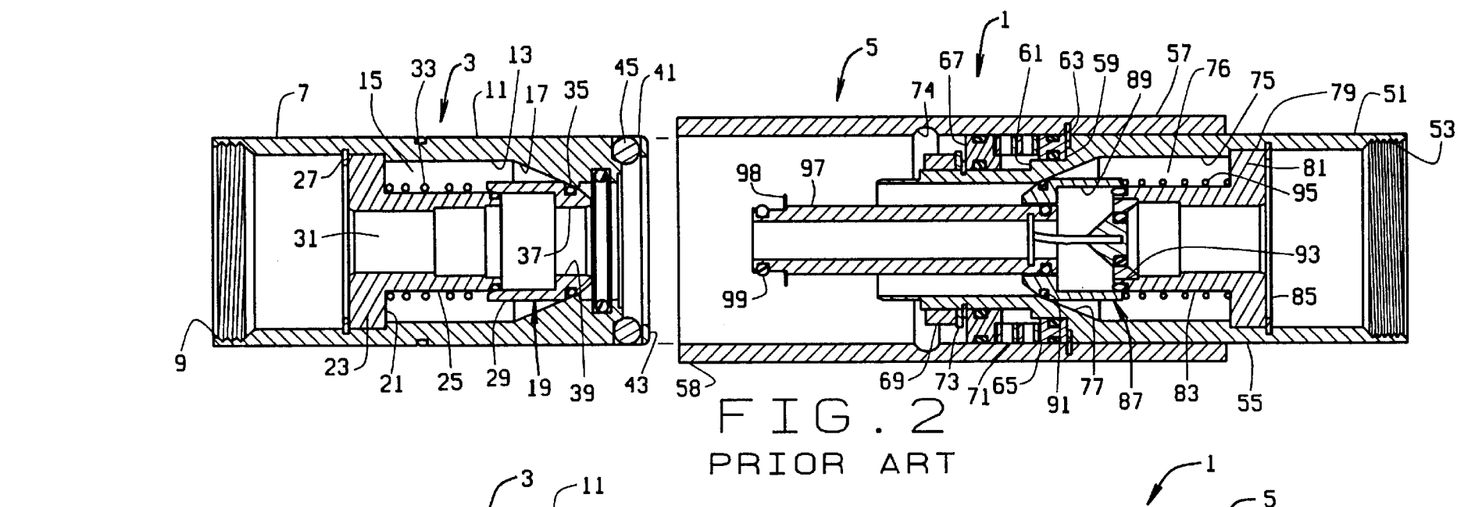
FIG. 2 is a cross-sectional view of a prior art breakaway coupling when uncoupled.
Figure 3:
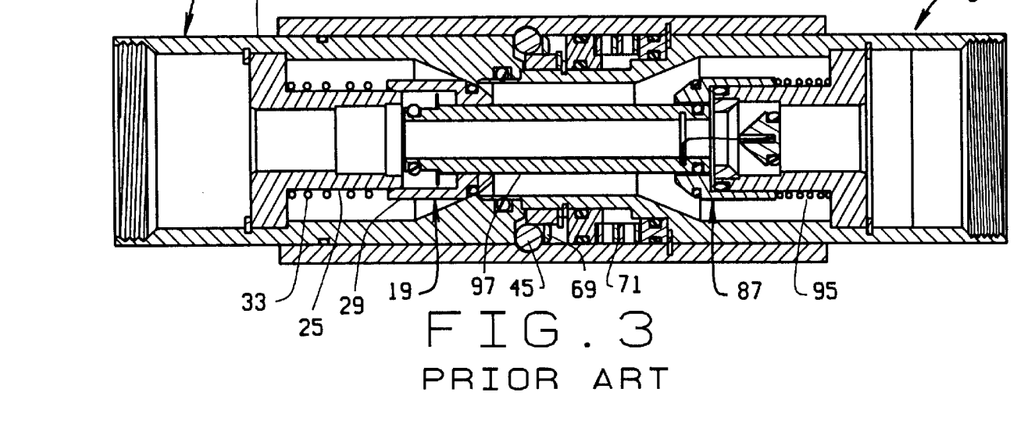
FIG. 3 is a cross-sectional view of the prior art breakaway coupling when coupled.

A prior art breakaway coupling 1 is shown in FIGS. 2 and 3. The coupling 1 includes two fittings 3 and 5 which are mated together, as described below. The first fitting 3 is downstream and is connected either to the back of the nozzle N or to the portion of the hose extending from the nozzle N. The second fitting 5 is the upstream portion, and is connected to the portion of the hose H extending from the fuel source (i.e., the gas pump).

The first fitting 3 includes a nut-like member 7 which is threaded, as at 9, so that the fitting 3 can be connected to the nozzle, or the fuel line leading to the nozzle. A sleeve 11 extends forwardly from the nut-like member 7 and, as described below, is sized to be received in the second fitting 5. The sleeve 11 has generally cylindrical internal walls 13 which define a fuel passageway 15 and generally conical walls 17 therein to provide a valve seat for seating a check valve 19.

A spider mount 21 having a plurality of fins 23 is housed in member 7 and includes a sleeve 25 extending axially through the fitting sleeve 11. The spider 21 is positionally fixed within member 7 by a retaining ring 27 and provides a means for supporting the check valve 19 within the fitting 7. The check valve 19 contains an integral sleeve 29 which slides on spider sleeve 25. The sleeve 29 defines a vapor flow path 31. A spring 33 surrounds spider sleeve 25 and is positioned between the spider fins 23 and the back of the check valve sleeve 29. The spring 33 thus biases against the back surface of valve sleeve 29 thereby normally biasing the check valve 19 forwardly within fitting 7 to seat against the fitting wall 17. An O-ring 35 is mounted upon the surface of valve 19 to provide a sealed closure when check valve 19 seats against valve seat 17. Check valve 19 has an opening 37 at its forward end defined by a circular wall 39.

A series of apertures 41 are formed at the forward end 43 of fitting sleeve 11. Each aperture holds a detent ball 45 which is fixed within the aperture 41 by peening or any other structural holding means which provides for limited radial movement of the balls 45.

The second fitting 5 also includes a nut-like member 51 having a series of internal threads 53 which are designed to connect the fitting 5 to the up-stream portion of the hose H. An internal sleeve 55 extends from the member 51 and fits securely inside an outer sleeve 57. The outer sleeve is sized, at its forward end 58, to receive the first fitting sleeve 11. The internal sleeve 55 is stepped as at 59 and 61 to define reduced diameter sections of the sleeve 55. A retaining ring 63 which is fixed within a groove in the outer sleeve 57 provides a stop against which the step 59 rests to limit axial movement of the inner sleeve 55 relative to the outer sleeve 57. A ring 65 surrounds the inner sleeve 55 just below the first step 59. The ring 65 includes inner and outer circumferential grooves which receive inner and outer O-rings to provide a fluid tight seal between the inner sleeve 55 and the outer sleeve 57. A second ring 67 surrounds the sleeve 55 spaced axially from the first ring 65. The second 67 ring is also grooved to provide a seat for inner and outer O-rings to provide a second fluid tight seal between the inner sleeve 55 and the outer sleeve 57. A latch ring 69 is axially fixed to the inner sleeve 55 spaced from the second ring 67. The latch ring 69 is fixed to the sleeve 55 by a retaining ring, but could be secured in other manners as well. A series of pre-loaded wave or disc springs 71 are positioned between the rings 65 and 67, and a further wave or disc spring 73 is positioned between the ring 67 and the latch ring 69. An inner groove 74 is positioned on the inner wall of the outer sleeve 57 such that it is partially overlapped by the latch ring 69.

The inner wall 75 of the inner sleeve 55 defines a fuel passageway 76 and a valve seat 77. A spider mount 79 having a plurality of fins 81 and a spider sleeve 83 is positionally fixed within the inner sleeve 55 by means of the retaining ring 85. The spider mount 79 supports a check valve 87 within fitting 5. The check valve 87 has an integral sleeve 89 which is sized to slide over sleeve 83. An O-ring 91 is provided on the valve 87 to form a seal when the valve 87 seats against the valve seat 77. An O-ring 93 is provided on the end of the spider sleeve 83 to prevent leakage of fluid between the sleeves 89 and 83. A spring 95 is positioned between the spider fins 81 and the check valve sleeve 89 to bias the check valve 87 forwardly to normally be in a closed position (as seen in FIG. 2). An elongate cylinder 97 extends away from check valve 87 and through, and beyond the end of, the inner sleeve 55. The cylinder 97 includes a retaining ring 98 and an O-ring 99 at its back end. The cylinder 97 is sized to be received within the opening 37 of the first fitting check valve 19.

To assemble or couple the first fitting 3 to the second fitting 5, the first and second fittings are aligned so that the second fitting cylinder 97 will pass into the first fitting check valve opening 37 and so that the first fitting sleeve 11 will pass into the second fitting outer sleeve 57. The two fittings are pressed together until the detent balls 45 in the first fitting are received in the groove 74 in the second fitting outer sleeve. As the first fitting is pressed into the second fitting, the respective check valves of the two fittings will be opened to allow for the flow of fuel and vapors through the coupling 1.

Upon exertion of force, detent balls 45 become disengaged from detent groove 74. In the prior art device of FIGS. 1 and 2, the force required to disengage the coupling is considerable, on the order of 200 lbs. Similarly, only a slight amount of pressure is required to assemble the two fittings together. As discussed above, because only a slight amount of pressure is required to reassemble the fitting, when a coupling is disengaged, often the customer will simply reassemble the coupling, rather than report the incident. Thus, the gas station operator may not know if the coupling was disengaged, and whether the hose (or the coupling) needs to be checked for possible damage. Therefore, a potentially damaged coupling or hose can be placed into use.

Figure 4:
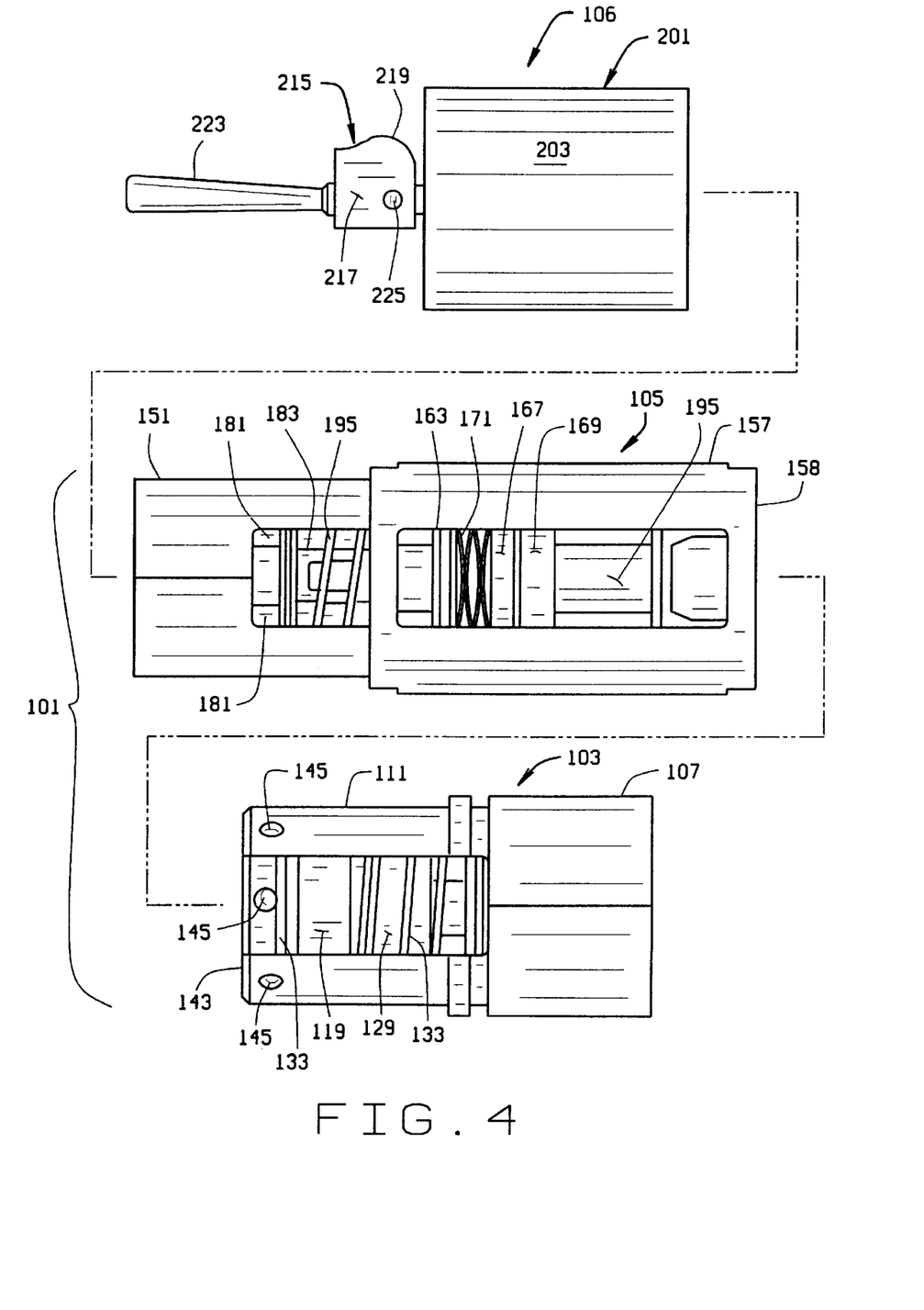
FIG. 4 is an exploded view, partially cut away, of the breakaway coupling of the present invention along with a coupler which can be used to both couple and uncouple the coupling.
Figure 5:
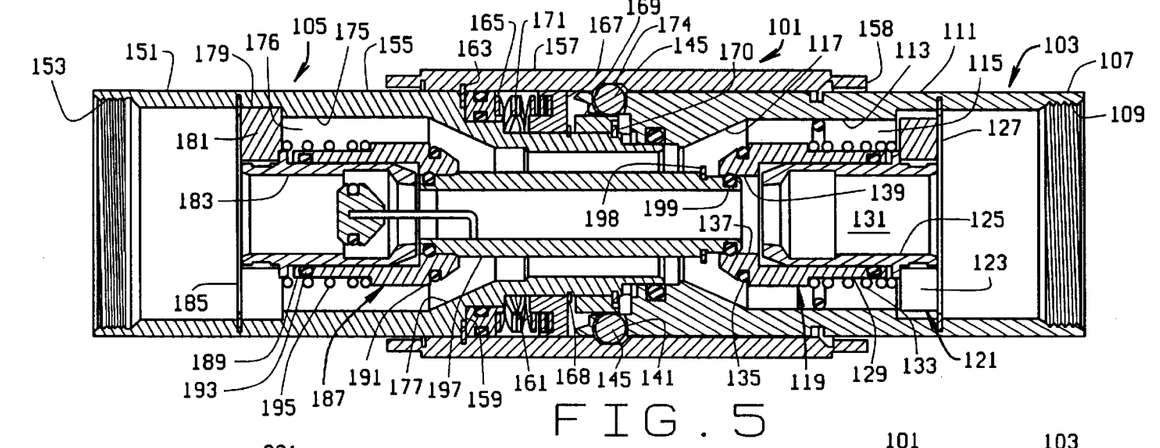
FIG. 5 is a cross-sectional view of the breakaway coupling when assembled.

The breakaway coupling 101 of the present invention is shown in FIG. 5. It includes a first fitting 103 and a second fitting 105 which are mated together as will be described below. Unlike the prior art coupling 1, the breakaway coupling 101 requires a substantial amount of force (i.e., more force than can easily be generated by an average person) to recouple the coupling. For example, the coupling can require upwards of 200 lbs. of force to be recoupled. Because this amount of force is not easily generated by an average person, a coupler 106 (FIG.4) is provided. The coupler 106 attaches to the back end of the second fitting 105, as will be discussed below, and enables the two fittings to be easily assembled together without the need for the assembler to exert a significant amount of force.

The first fitting 103 is downstream and is connected either to the back of the nozzle N or to the portion of the hose extending from the nozzle N. The second fitting 105 is the upstream portion, and is connected to the portion of the hose H extending from the fuel source (i.e., the gas pump).

The first fitting 103 includes a nut-like member 107 which is threaded, as at 109, so that the fitting 103 can be connected to the nozzle, or the fuel line leading to the nozzle. A sleeve 111 extends forwardly from the nut-like member 107 and, as described below, is sized to be received in the second fitting 105. The sleeve 111 has generally cylindrical internal walls 113 which define a fuel passageway 115 and generally conical walls 117 therein to provide a valve seat for seating a check valve 119.

A spider mount 121 having a plurality of fins 123 is housed in member 107 and includes a sleeve 125 extending axially through the fitting sleeve 111. The spider 121 is postionally fixed within member 107 by a retaining ring 127 which is received in a groove in the member 107. The spider 121 supports the check valve 119 within the fitting 107. The check valve 119 contains an integral sleeve 129, which slides on spider sleeve 125. The sleeve 129 defines a vapor flow path 131. A spring 133 surrounds spider sleeve 125 and is positioned between the spider fins 123 and the back of the check valve sleeve 129. The spring 133 thus biases against the back surface of valve sleeve 129 thereby normally biasing the check valve 119 forwardly within fitting 107 to seat against the fitting wall 117, when the fittings are separated (for example, as seen in the prior art fittings of FIGS. 1 and 2). An O-ring 135 is mounted upon the surface of valve 119 to provide a sealed closure when check valve 119 seats against valve seat 117. Check valve 119 has an opening 137 at its forward end defined by a circular wall 139.

A series of apertures 141 are formed at the forward end 143 of fitting sleeve 111. Each aperture holds a detent ball 145 which is fixed within the aperture 141 by peening or any other structural holding means which provides for limited radial movement of the balls 145.

The second fitting 105 also includes a nut-like member 151 having a series of internal threads 153 which are designed to connect the fitting 105 to the up-stream portion of the hose H. An internal sleeve 155 extends from the member 151 and slidingly fits inside an outer sleeve 157. The outer sleeve 157 is sized, at its forward end 158, to receive the first fitting sleeve 111. The internal sleeve 155 is stepped as at 159 and 161 to define reduced diameter sections of the sleeve 155. A retaining ring 163, which is fixed within a groove in the outer sleeve 157, provides a stop against which the step 159 rests to limit axial movement of the inner sleeve 155 relative to the outer sleeve 157. A ring 165 surrounds the inner sleeve 155 just below the first step 159. The ring 165 includes inner and outer circumferential grooves which receive inner and outer O-rings to provide a fluid tight seal between the inner sleeve 155 and the outer sleeve 157. A second ring 167 surrounds the sleeve 155 spaced axially from the first ring 165. A series of pre-loaded wave or disc springs 171 are positioned between the rings 165 and 167. A retaining ring 168 is received in a groove along the outer surface of the inner sleeve 155, and the second ring 167 rests against the retaining ring 168. As can be seen, the first ring 163, the spring washers 171, and the second ring 167 are positioned between the retaining rings 163 and 168 to limit axial movement of these elements.

As noted above, the retaining ring 163 is received in the inner surface of the outer sleeve and the retaining ring 168 is received in the outer surface of the inner sleeve. Thus, the spring washers 171 normally urge the inner sleeve 155 inwardly, relative to the outer sleeve 157.

A latch ring 169 is axially fixed to the inner sleeve 155 spaced slightly forwardly of the second ring 167. It is held in place on the sleeve 155 by a retaining ring 170, but could be secured in place in any other conventional manner. An inner groove 174 is positioned on the inner wall of the outer sleeve 157 such that it is partially overlapped by the latch ring 169.

The inner wall 175 of the inner sleeve 155 defines a fuel passageway 176 and a valve seat 177. A spider mount 179 having a plurality of fins 181 and a spider sleeve 183 is positionally fixed within the inner sleeve 155 by means of the retaining ring 185. The spider mount 179 supports a check valve 187 within fitting 105. The check valve 187 has an integral sleeve 189 which is sized to slide over the spider sleeve 183. An O-ring 191 is provided on the valve 187 to form a seal when the valve 187 seats against the valve seat 177. An internal O-ring 193 is provided near the top valve sleeve 189 to form a fluid tight seal between the valve sleeve 189 and the spider sleeve 183. A spring 195 is positioned between the spider fins 181 and the check valve sleeve 189 to bias the check valve 187 forwardly to normally be in a closed position. (The check valve is shown to be opened in FIGS. 5 and 6). An elongate cylinder 197 extends away from check valve 187 and through and beyond the end of, the inner sleeve 155. The cylinder 197 includes a retaining ring 198 and an O-ring 199 at its forward end. The cylinder 197 is sized to be received within the opening 137 of the first fitting check valve 119.

When the coupling 101 is assembled, as seen in FIG. 5, the first fitting sleeve 111 is received in the second fitting outer sleeve 157 and the detent balls 145 are received in the groove 174. The detent balls 145 are held in the groove 174 by the latch ring 169. The force of the spring washers 171 urge the sleeve 155 forwardly to the position seen in FIG. 5 to maintain the detent balls 145 in the groove 174 and to prevent the balls 145 from being disengaged from the groove 174. Additionally, the cylinder 197 is received in the first fitting check valve opening 137 and the cylinder O-ring 199 seals against the opening wall 139. When the coupling 101 is assembled, the check valves 119 and 187 will be pushed back against their respective springs 133 and 195 so that the check valves 119 and 187 will be in their opened positions. The check valves 119 and 187 and the cylinder 197 define a vapor recovery flow path which is in fluid communication with the vapor recovery flow path through the hose H. When the check valves are opened, the annular space between the sleeves 155 and 111 and the check valves 119 and 189 and the cylinder 197 defines the fuel flow path which fuel follows from the fuel source (gas pump) to the nozzle N. Thus, when the check valves are closed (as when the fittings are separated from each other), the fuel flow path is closed, and fuel cannot flow from the gas pump through the hose.

To disassemble the coupling 101, the detent balls 145 must be disengaged from the detent groove so that the fittings 103 and 105 can be separated from each other. In order to do this, the force pulling the fittings apart must exceed the force of the spring washers 171 (which bears against the sleeve 155 to hold the detent balls 145 in the groove 174). The spring washers 171 are designed such that the force required to disassemble the coupling 101 is more than can be easily generated by the average person. For example, in the preferred embodiment, the force required to separate the first and second fittings is 200 lbs. Although this force cannot easily be generated by a person, it can be fairly easily generated by a car being driven from a gas pump with the fuel nozzle still in its fuel tank feed pipe. Thus, the coupling will still become disassembled and accomplish its purpose (i.e., to shut off the flow of fuel and vapors through the hose H when the coupling is disassembled). Additionally, this amount of force is less than the tensile strength of the hose, and the hose should not be damaged when the coupling 101 is separated.

Because significant force is required to disengage the coupling 101, the same amount of force is required to assemble the coupling 101. To assemble the coupling (i.e., to connect the first and second fittings such that the detent balls 145 are received in the groove 174 and held in place by the ring 169), the force of spring washers 171 must similarly be overcome. To make this task easier, the coupler 106 is provided. As described below, when the coupler 106 is used, the coupling 101 can be assembled very quickly and very easily without the need for the person assembling the coupling to exert a significant amount of force.

The coupler 106 (FIGS. 4, 6 and 7) includes an outer body 201 having a side wall 203 and an end wall 205. The body 201 is opened at its end opposite the end wall 205, and the side wall has an end surface 207. A shaft 209 extends through the body end wall 205. The shaft is not fixed to the body end wall 205, and hence, can rotate relative to the body end wall 205 and the body 201. A plate 211 is positionally fixed to the end of the shaft 205 within the body 201 so that the plate 211 will rotate with the shaft 209. As shown, the shaft 209 is threaded at its end, and the plate 211 is secured to the shaft 209 by bolts which sandwich the plate 211 and frictionally hold the plate in place on the shaft 209. Any other conventional means, such as welding, can be used to secure the plate 211 to the shaft 209. The shaft 209 and plate 211, can, in fact, be a single unitary piece. The plate 211 is externally threaded along its peripheral wall 213.

Figure 6:
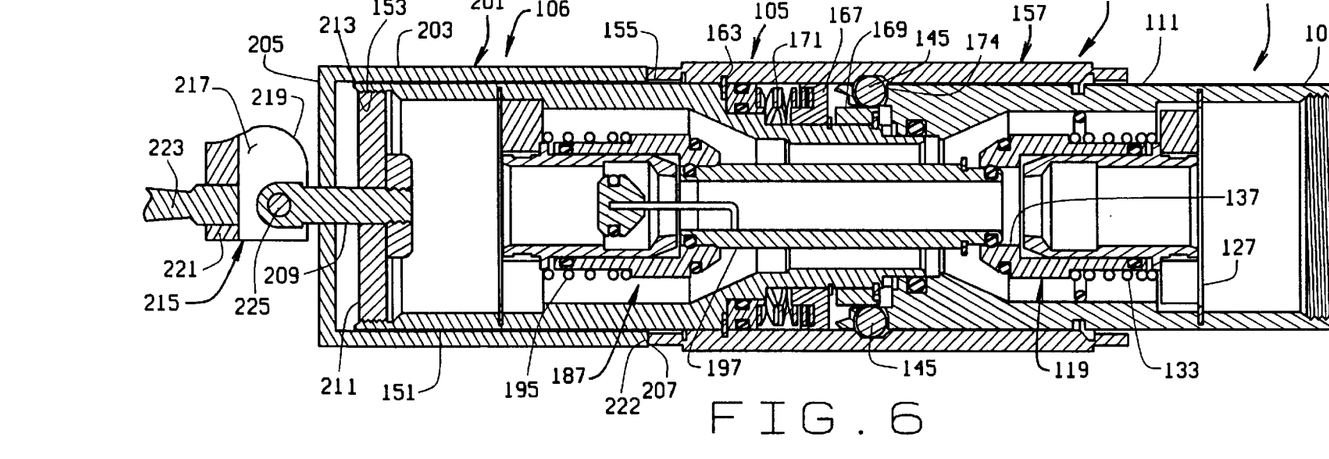
FIG. 6 is a cross-sectional view of the breakaway coupling in a coupled position with the uncoupler mounted to the coupling.
Figure 7:
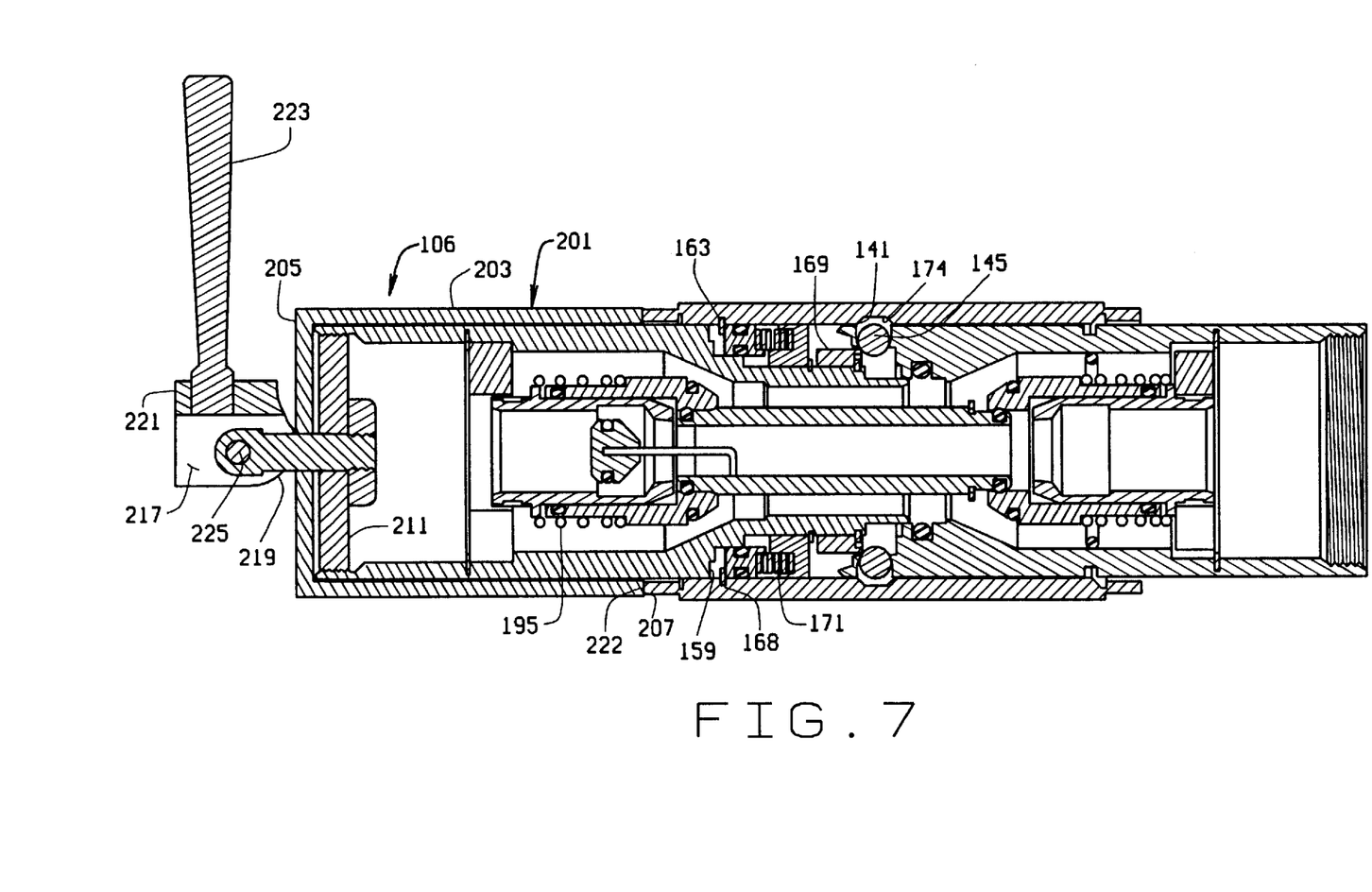
FIG. 7 is a cross-sectional view similar to FIG. 6, but with the uncoupler moved to a position which allows for only slight force to be used to uncouple or couple the breakaway coupling.

A cam 215 is pivotally connected to the opposite, outer, end of the shaft 209. The cam 215 has a pair of spaced apart cam legs 217, each of which has a camming surface 219. A cam plate 221 extends between the cam legs 217 and a handle 223 extends from the cam plate 221. A pin 225 extends between the cam legs 217 and through the shaft 209 to pivotally mount the cam 215 to the shaft 209.

The operation of the coupler 106 is shown in FIGS. 6 and 7. Although the coupler 106 is shown being used to uncouple the coupling 101, it will be apparent that the manner in which the coupler 106 operates is the same whether it is being used to assemble or disassemble the coupling 101. The coupler 106 is initially mounted to the end of the second fitting 105 by threading the coupler plate 211 into the threads 153 of the nut-like member 151. The plate 211 is threaded into the member 151 until the end surface 207 of the coupler body wall 203 engages the end surface 222 of the second fitting outer sleeve 157.

When the coupler 106 is mounted to the second fitting 105, the lever 223 is pivoted from the position shown in FIG. 6 to the position shown in FIG. 7 to bring the camming surfaces 219 in contact with the body end wall 205. When the lever 223 is pivoted in this manner, the coupler body end surface 207 bears against the second fitting outer sleeve 157, and the plate 211 is pulled upwardly toward the end wall 205. When the plate 211 is pulled upwardly, the plate 211 pulls with it the second fitting inner sleeve 155 and thus moves the sleeve 155 slightly outwardly relative to the outer sleeve 157. When this happens, the spring washers 171 are compressed, and, more importantly, the latch ring 169 is pulled out of alignment with the outer sleeve groove 174 allowing the balls 145 to move radially in their openings 141. Thus, when the coupling 101 is being disassembled, the detent balls 145 can move radially inwardly in their holes to disengage the groove 174. The first fitting 103 can then easily be removed from the second fitting 105. Conversely, when the coupling 101 is to be assembled, when the coupler is operated to move the ring 169 out of alignment with the groove 174, the first fitting 103 can be easily inserted into the second fitting 105. When the lever 223 is then moved to its position, as seen in FIGS. 4 and 6, the second fitting inner sleeve 155 is moved back to its normal position, and the ring 169 will urge the detent balls radially outwardly into the groove 174 to lock the two fittings together against the force of the spring washers 171.

As can be appreciated, the use of the lever relies on the use of leverage to overcome the force of the spring washers 171 to enable the coupling 101 to be assembled or disassembled. When the coupler 106 is used, the assembler need exert a force which can be easily generated by the average person (i.e., 5–10 lbs.) against the lever to overcome the force of the spring washers 171 to assemble and disassemble the coupling 101.

As various changes could be made in the above constructions without departing from the scope of the invention, it is intended that all matter contained in the above description or shown in the accompanying drawings shall be interpreted as illustrative and not in a limiting sense. For example, the groove 174 could be replaced with detents positioned to receive the detent balls 145. This would require that the first and second fittings be keyed so that the detent balls would be aligned with the detents when the coupling is assembled. The spring washers 171 could be replaced by a spiral spring. The retaining ring 163 provides a stop to limit axial movement of the inner sleeve 155 relative to the outer sleeve 157. This ring 163 could be replaced with a shoulder, circumferential rib, or other similar structure formed on the inner surface of the outer sleeve 157. The retaining ring 168 and the second ring 167 of the second fitting 105 could be omitted. In this case the springs 171 would bear directly against the latch ring 169. The spring force of the spring 171 can be altered as desired. All that is necessary is that the spring force be greater than that which can be easily generated by an average person and less then the tensile strength of the hose H. A spring force of at least 150 lbs. should be sufficient. These examples are merely illustrative.

What is claimed is:

1. In combination, a breakaway coupling and a coupler to facilitate assembly and disassembly of the breakaway coupling which is inserted in a fuel line between a fuel dispensing nozzle and a source of fuel;

the breakaway coupling comprising:

a first fitting; the first fitting including a hollow sleeve defining a fuel flow path, a check valve movable in the sleeve between a closed position and an opened position to close and open the fuel flow path, at least one opening at a distal end of the first fitting sleeve, and at least one detent ball received in the at least one opening and movable radially in the at least one opening; and a second fitting; the second fitting including:

an outer hollow sleeve sized to receive the first fitting sleeve, the outer sleeve having a groove on an inner surface, the groove being positioned on the outer sleeve to receive the at least one first fitting detent ball when the first and second fittings are assembled together;

an inner hollow sleeve slidingly received in the outer sleeve and defining a fuel flow path through the second fitting; the inner sleeve including a check valve movable in the sleeve between a closed position and an opened position to close and open the fuel flow path;

the inner sleeve having a reduced diameter section defining an annular space between the inner and outer sleeves; the reduced diameter section including a latch ring positionally fixed to the reduced diameter section outer surface;

a stop on an inner surface of the outer sleeve, the stop limiting axial movement of the inner sleeve relative to the outer sleeve;

a spring member positioned between the outer sleeve stop and the latch ring; the spring member biasing the inner sleeve to normally bear against the stop; the latch ring being positioned to be substantially aligned with the groove when the inner sleeve is in its normal position;

the coupler including:

a housing opened at one end, the housing having a side wall, an end wall, and an end surface on the end wall at the opened end of the housing;

a plate received in the housing for axial movement within the housing; the plate being mountable to the second fitting inner sleeve; and a cam on an outer surface of the housing end wall and operatively connected to the plate by a rod extending through the housing end wall; the cam having a camming surface; the cam being pivotable between a first position in which the camming surface is out of engagement with the housing end wall and a second position in which the camming surface engages the housing end wall as the cam; the housing end wall being sized to abut an end surface of the second fitting outer sleeve when the plate is mounted to the second fitting inner sleeve and the cam is in the first position; whereby, as the cam is moved to the second position, the plate is pulled toward the housing end wall, thereby pulling the second fitting inner sleeve axially in the outer sleeve against the force of the spring to move the latch ring out of alignment with the groove sufficiently to enable the detent ball to move radially in its associated opening and to disengage the groove.

2. The combination of claim 1 wherein the second fitting inner sleeve is internally threaded at an end thereof, and the coupler plate has a peripheral surface which is threaded; the plate being threadably mountable to the second fitting inner sleeve.

3. The combination of claim 1 wherein the second fitting spring member comprises at least one spring washer.

4. The combination of claim 1 wherein the second fitting spring member has a spring force greater than the force which can be easily generated by an average person.

5. The combination of claim 4 wherein the second fitting spring force is at least 150 lbs.

6. A coupler mountable to a fitting of a breakaway coupling to facilitate assembly and disassembly of the coupling;

the coupling having a first fitting and a second fitting; the first fitting being slidably received in the second fitting; the first fitting having detent balls; the second fitting having an outer sleeve including a groove which receives the detent balls, an inner sleeve slideable in the outer sleeve, a latch ring on the inner sleeve alignable with the groove, and a spring which biases the latch ring into alignment with the groove to urge the detent balls into engagement with the groove to hold the two fittings together;

the coupler including:

a housing opened at one end, the housing having a side wall, an end wall, and an end surface on the end wall at the opened end of the housing;

a plate received in the housing for axial movement within the housing; the plate being mountable to the second fitting inner sleeve; and a cam on an outer surface of the housing end wall and operatively connected to the plate by a rod extending through the housing end wall; the cam having a camming surface; the cam being pivotable between a first position in which the camming surface is out of engagement with the housing end wall and a second position in which the which engages the housing end wall as the cam; the housing end wall being sized to abut an end surface of the second fitting outer sleeve when the plate is mounted to the second fitting inner sleeve and the cam is in the first position; whereby, as the cam is moved to the second position, the plate is pulled toward the housing end wall, thereby pulling the second fitting inner sleeve axially in the outer sleeve against the force of the spring to move the latch ring out of alignment with the groove sufficiently to enable the detent ball to move radially in its associated opening and to disengage the groove.

7. The coupler of claim 6 wherein the second fitting inner sleeve is internally threaded at an end thereof, and the coupler plate has a peripheral surface which is threaded; the plate being threadably mountable to the second fitting inner sleeve.

8. The coupler of claim 6 wherein the second fitting spring member comprises at least one spring washer.

9. The coupler of claim 6 wherein the second fitting spring member has a spring force greater than the force which can be easily generated by an average person.

10. The coupler of claim 9 wherein the second fitting spring force is at least 150 lbs.

* * * * *